US011762640B2

(12) United States Patent
Irie et al.

(10) Patent No.: US 11,762,640 B2
(45) Date of Patent: Sep. 19, 2023

(54) PROGRAM, INFORMATION CONVERSION DEVICE, AND INFORMATION CONVERSION METHOD

(71) Applicant: THE UNIVERSITY OF TOKYO, Tokyo (JP)

(72) Inventors: Hidetsugu Irie, Tokyo (JP); Shuichi Sakai, Tokyo (JP); Toru Koizumi, Tokyo (JP); Satoshi Nakae, Tokyo (JP); Akifumi Fukuda, Tokyo (JP)

(73) Assignee: THE UNIVERSITY OF TOKYO

( * ) Notice: Subject to any disclaimer, the term of this patent is extended or adjusted under 35 U.S.C. 154(b) by 0 days.

(21) Appl. No.: 17/612,734

(22) PCT Filed: May 21, 2020

(86) PCT No.: PCT/JP2020/020033
§ 371 (c)(1),
(2) Date: Nov. 19, 2021

(87) PCT Pub. No.: WO2020/235616
PCT Pub. Date: Nov. 26, 2020

(65) Prior Publication Data
US 2022/0236970 A1     Jul. 28, 2022

(30) Foreign Application Priority Data

May 21, 2019    (JP) ................... 2019-095442

(51) Int. Cl.
G06F 8/41      (2018.01)
(52) U.S. Cl.
CPC ...................... G06F 8/44 (2013.01)
(58) Field of Classification Search
CPC .................................. G06F 8/40–52
(Continued)

(56) References Cited

U.S. PATENT DOCUMENTS 6,182,284 B1 * 1/2001 Sreedhar ................ G06F 8/433
717/146
9,875,101 B1 * 1/2018 Qi ........................... G06F 8/433

FOREIGN PATENT DOCUMENTS

JP    2000-259411 A    9/2000
JP    2000-284968 A    10/2000

OTHER PUBLICATIONS

Koizumi, Toru, et al., Reduction of instruction increase overhead by STRAIGHT compiler, 2018 Sixth International Symposium on Computing and Networking Workshops (CANDARW), Nov. 27-30, 2018, 7 pages, [retrieved on Jan. 3, 2023], Retrieved from the Internet: <URL:http://ieeexplore.ieee.org/>.*

(Continued)

*Primary Examiner* — Geoffrey R St Leger
(74) *Attorney, Agent, or Firm* — Harness, Dickey & Pierce, P.L.C.

(57) ABSTRACT

An information conversion device has one of: a replication necessity analysis unit for specifying where an instruction referred by phi functions is present in one basic block and inserting a transfer instruction therein; an intra-loop constant analysis unit for specifying a closed path in which a phi function reference is circulated and inserting the transfer instruction therein; an inter-instruction dependency analysis unit for specifying where data dependency is present between instructions as a reference destination of the phi functions and inserting the transfer instruction therein; a same instruction reference analysis unit for specifying where the phi functions referring to a result of a same instruction before branching are present and inserting the transfer instruction therein; and a spill out validity analysis unit for storing a value present in a loop processing, loading the value after the loop processing ends, and deleting the transfer instruction.

9 Claims, 11 Drawing Sheets

(58) Field of Classification Search
USPC .................................................. 717/140–161
See application file for complete search history.

(56) References Cited

OTHER PUBLICATIONS

Hidenori Matsuzki, Hiroko Fujii, Nobuhiro Kondo, Toshiba Corp. Corporate Research & Development Center. "A Register Allocation Method for an Out-of-order System without Register Renaming Mechanism", May 30, 2020, ISSN 1344-0640, IPSJ Symposium Series vol. 2000, No. 6 (9 pages, cited as a category A reference in ISR).

Kazunori Sakai et al., "Consideration of the implementation of speculative memory forwarding in STRAIGHT", Jan. 16, 2017, Information Processing Society of Japan, IPSJ SIG Technical Report, vol. 2017-ARC-224, No. 34 (9 pages with English abstract).

Hidetsugu Irie, Shuichi Sakai, Toru Koizumi, Satoshi Nakae, Akifumi Fukuda, "STRAIGHT: Hazardless Processor Architecture Without Register Renaming", Oct. 21, 2018 (13 pages).

Hidetsugu Irie, Shuichi Sakai, Toru Koizumi, Satoshi Nakae, Akifumi Fukuda, "STRAIGHT . . . ", Jun. 14, 2018, Infomnation Processing Society of Japan, IPSJ SIG Technical Report, vol. 2018-ARC-231, No. 2 (11 pages with English abstract).

International Search Report (English and Japanese) of the International Searching Authority issued in PCT/JP2020/020033, dated Aug. 18, 2020; ISA/JP (6 pages).

\* cited by examiner

FIG. 3

```
01: ADDi $zero, 1    # 1
02: ADDi $zero, 1    # 1
03: ADD [2], [1]     # 1+1 → 2
04: ADD [2], [1]     # 1+2 → 3
05: ADD [2], [1]     # 2+3 → 5
```

FIG. 9A

```
void fill( int arr[], int N, int val ) {
  for( int i = 0; i < N; ++i ) {
    arr[i] = val;
  }
}
```

FIG. 9B

```
01: Function_fill:
02:   ADDi #zero, 0
03:   NOP
04: Label_for_cond:
05:   BEQ  [2], [5], Label_for_end
06:   ST   [5], [7], 0
07:   ADDi [8], 4        # &arr[i]
08:   RMOV [8]           # N
09:   RMOV [8]           # val
10:   RMOV [8]           # _RetAddr
11:   ADDi [8], 1        # ++i
12:   J    Label_for_cond
13: Label_for_end:
14:   JR   [4]
```

FIG. 9C

```
01: Function_fill:
02:   SPADDi -4
03:   RMOV [4]
04:   RMOV [4]
05:   RMOV [4]
06:   ADDi #zero, 0
07:   ST   [3], [2], 0 # -4(FP)
08: Label_for_cond:
09:   BEQ  [2], [4], Label_for_end
10:   ST   [4], [6], 0
11:   ADDi [7], 4        # &arr[i]
12:   RMOV [7]           # N
13:   RMOV [7]           # val
14:   ADDi [7], 1        # ++i
15:   J    Label_for_cond
16: Label_for_end:
17:   SPADDi 4
18:   LD   [1], -4    # -4(FP)
19:   JR   [1]
```

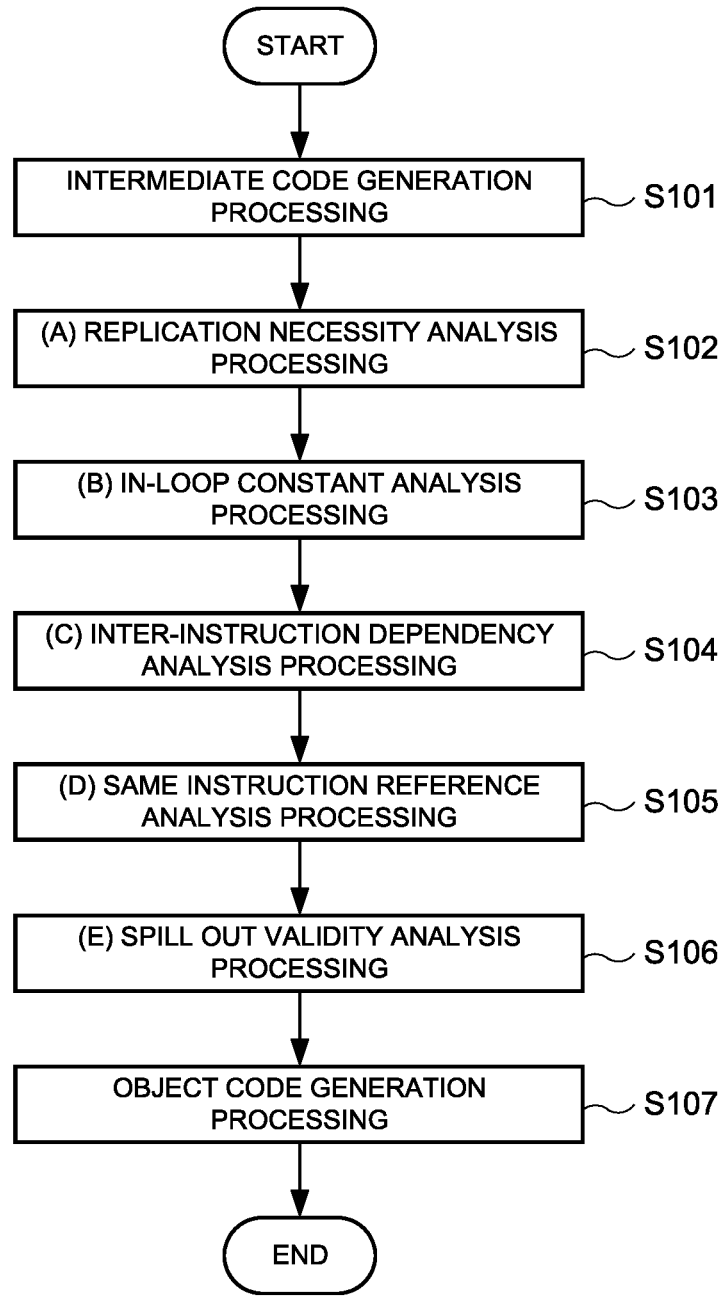

US 11,762,640 B2

PROGRAM, INFORMATION CONVERSION DEVICE, AND INFORMATION CONVERSION METHOD

CROSS REFERENCE TO RELATED APPLICATIONS

This application is a 371 U.S. National Phase of International Application No. PCT/JP2020/020033, filed on May 21, 2020, which claims priority to Japanese Application No. 2019-095442, filed on May 21, 2019. The entire disclosures of the above applications are incorporated herein by reference.

BACKGROUND

Technical Field

The present invention relates to a program, an information conversion apparatus, and an information conversion method.

Related Art

With the demand for improved processing power of processor, multiple cores are implemented on a processor with the miniaturization of semiconductor process. However, Dennard scaling has failed and resulting in a problem called dark silicon, where all transistors on a die cannot be driven simultaneously due to power limitation. As a result, there is a demand for a processor with higher power efficiency.

As a processor improving power efficiency, a processor that utilizes instruction level parallelism (ILP) has been proposed, and as described in Patent Application Publication No. 2000-259411, a processor with an out of order execution function swapping a processing order of an instruction code is disclosed.

In a processor corresponding to out-of-order execution such as a processor described in Patent Application Publication No. 2000-259411, it is necessary to avoid a problem where a register originally referenced by a previous instruction is overwritten by a subsequent instruction when an instruction code is switched. A method used to avoid the problem is register renaming, in which a logical register number written in code is replaced by a physical register number actually used.

However, as the resource management, a lot of power is consumed for register renaming relating a logical register space to a physical register space, i.e., processing other than an original computational processing, which results in a problem that power efficiency of the processor as whole deteriorates.

The present invention has been made in view of the above circumstances and provided a technology to convert information (source code to binary code or binary code to binary code) achieving small size and high processing performance for a processor capable of executing out-of-order without register renaming.

SUMMARY

According to one aspect of the present invention, provided is a program configured to allow a computer to function as an information conversion apparatus comprising at least one of: (A) a replication necessity analysis processing unit configured to specify a location having an instruction referred by a plurality of phi functions present in one basic block, and to insert an inter-register transfer instruction into the location of the instruction; (B) an in-loop constant analysis processing unit configured to specify a closed circuit in which a reference of a phi function is circulating, and to insert an inter-register transfer instruction into the closed circuit; (C) an inter-instruction dependency analysis processing unit configured to specify a location having data dependency among each instruction as a reference destination of a plurality of phi functions, and to insert an inter-register transfer instruction into the location; (D) a same instruction reference analysis processing unit configured to specify a location having a phi function referring to a result of same instruction before branching in a plurality of execution paths, and to insert an inter-register transfer instruction into the execution path; or (E) a spill out validity analysis processing unit configured to store a value of a variable with respect to an inter-register transfer instruction existing in a loop processing in a storage element other than a general-purpose register before starting the loop processing, to load the value after an end of the loop processing, and to delete the inter-register transfer instruction.

According to one aspect of the present invention, it is possible to allow a processor to operate with high power efficiency.

BRIEF DESCRIPTION OF THE DRAWINGS

FIG. 3 shows an example of assembly code with an operand in a relative position referring to a past execution result.

FIG. 9A shows a C source program having a loop structure. FIG. 9B shows an assembly code using an RMOV instruction. FIG. 9C shows an assembly code spilling out one of RMOV instructions in FIG. 9B.

FIG. 11 shows a flowchart of a compilation method according to an embodiment of the present invention.

DETAILED DESCRIPTION

Hereinafter, embodiments of the present invention will be described with reference to the drawings. Various features described in the embodiment below can be combined with each other.

A program for realizing a software in the present embodiment may be provided as a non-transitory computer readable medium that can be read by a computer, or may be provided for download from an external server, or may be provided so that the program can be activated on an external computer to realize functions thereof on a client terminal (so-called cloud computing).

In the present embodiment, the "unit" may include, for instance, a combination of hardware resources implemented by circuits in a broad sense and information processing of software that can be concretely realized by these hardware resources. Further, although various information is performed in the present embodiment, this information can be represented, for example, by physical signal values representing voltage and current, by high and low signal values as a bit set of binary numbers composed of 0 or 1, or by quantum superposition (so-called quantum bit). In this way, communication/calculation can be performed on a circuit in a broad sense.

Further, the circuit in a broad sense is a circuit realized by combining at least an appropriate number of a circuit, a circuitry, a processor, a memory, and the like. In other words, it is a circuit includes Application Specific Integrated Circuit (ASIC), Programmable Logic Device (e.g., Simple Programmable Logic Device (SPLD), Complex Programmable Logic Device (CPLD), and Field Programmable Gate Array (FPGA)), and the like.

Figure 1:
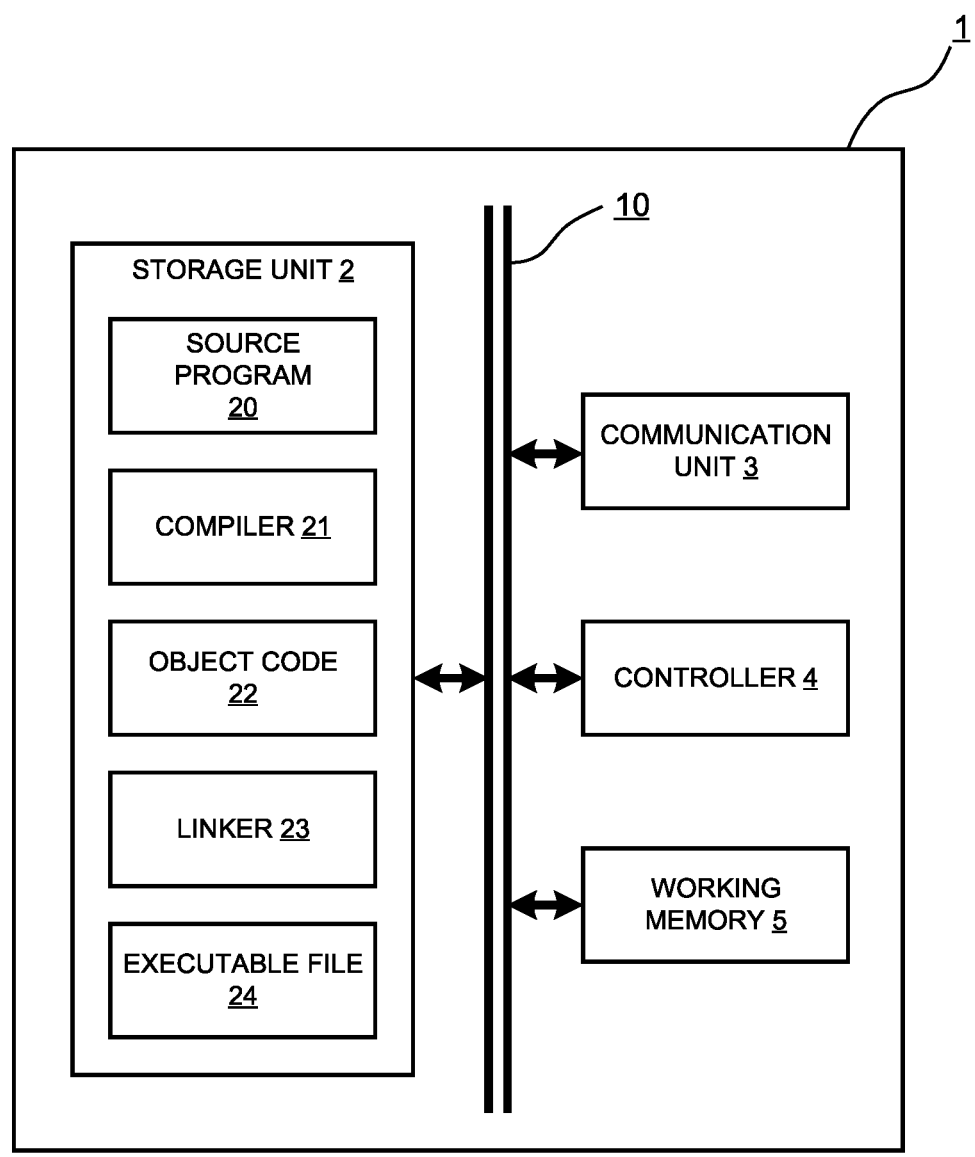
FIG. 1 shows a functional block diagram indicating a configuration overview of a compilation apparatus according to an embodiment of the present invention.

In the present embodiment, as an example of an information conversion apparatus, a compilation apparatus 1 generating an object code corresponding to a processor from a source program will be described. FIG. 1 is a functional block diagram showing a configuration overview of the compilation apparatus 1 according to the present embodiment. As shown in FIG. 1, the compilation apparatus 1 comprises a storage unit 2, a communication unit 3, a controller 4, and a working memory 5, and these components are electrically connected to the communication bus 10 in the compilation apparatus 1. Hereinafter, each component will be further described.

<Storage Unit 2>

The storage unit 2 is a volatile or non-volatile storage medium that stores various information. The storage unit 2 can be implemented, for instance, as a storage device such as a solid state drive (SSD) or a hard disk drive (HDD), or as a memory such as a random access memory (RAM) that stores temporarily necessary information (argument, array, or the like) regarding program operation, or any combination thereof.

In the storage unit 2 of the present embodiment, as shown in FIG. 1, a source program 20, a compiler 21, an object code 22, a linker 23, and an executable file 24 are stored.

The source program 20 is input information of the compiler 21 and is written in a programming language. The program language is not limited to C, C++, C#, Java, and other types. The source program 20 is provided by a supply source via the communication unit 3. Although the supply source is specifically an information processing apparatus connected to an external network, an external storage device such as a USB memory, or an input device such as a keyboard, the type of the apparatus or the device is not limited.

The compiler 21 stores a function of the compiler in the form of software that can be executed by the compilation apparatus 1. In addition, various parameters such as an optimization level at the time of compilation execution are stored together.

The object code 22 is an object code written in an instruction set that can be executed by a renamingless out-of-order execution processor after being processed by the compiler 21.

The linker 23 combines a plurality of the object codes 22 after compiling a plurality of the source programs 20 and a pre-prepared library (not shown) to generate a file in a form that can be executed by an apparatus as a target, i.e., an executable file 24, which is stored in the form of software.

Once the executable file 24 is stored in the storage unit 2, it is supplied to an external information processing apparatus or an external device via the communication unit 3 as needed. Alternatively, the compilation apparatus 1 itself can be configured to serve as an information processing apparatus that executes the executable file 24.

<Communication Unit 3>

The communication unit 3 transfers information to and from an external information processing apparatus, an external storage device such as a USB memory, and an input/output device such as a keyboard, a mouse, or a display. Wired communication means such as USB, IEEE1394, Thunderbolt, wired LAN network communication, wireless LAN network communication such as Wi-Fi, mobile communication such as 5G/LTE/3G, Bluetooth (registered trademark) communication or the like may be included as necessary. The communication means illustrated above are only examples, and a dedicated communication standard may be adopted as well. In other words, it is more preferable to carry out as a set of a plurality of the aforementioned communication means.

<Controller 4>

The controller 4 processes and controls overall operations regarding the compilation apparatus. The controller 4 is, for example, an unshown central processing unit (CPU). In the compilation apparatus 1, the CPU does not necessarily have to be a renamingless out-of-order execution processor, but can be either a Reduced Instruction Set Computer (RISC) or a Complex Instruction Set Computer (CISC), as long as it is capable of executing a software stored in the storage unit 2, further, CPU configuration parameters such as operating frequency, number of cores, and cache size regarding processing capability as CPU are also unlimited.

<Working Memory 5>

The working memory 5 is a memory used as a temporary working area when the control unit 4 performs compile process or link processing, although Random Access Memory (RAM) is commonly used, there is no limitation to the types such as Dynamic RAM (DRAM), Synchronous Dynamic RAM (SDRAM), and Static RAM (SRAM).

3. COMPILER

Figure 2:
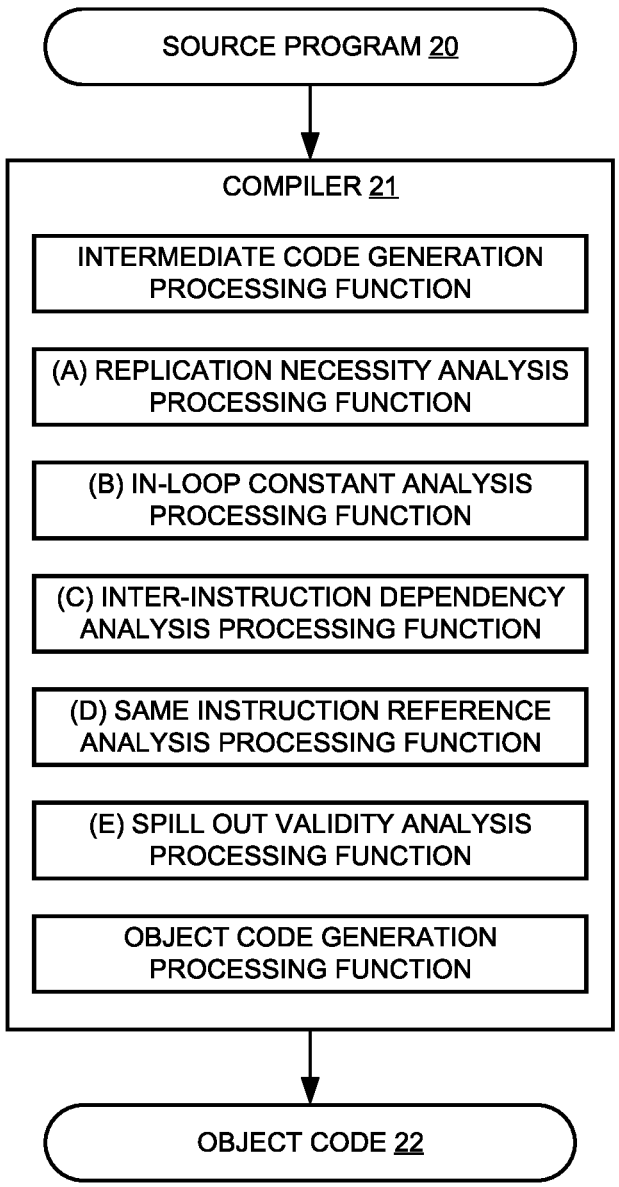
FIG. 2 shows a functional block diagram of a compiler according to an embodiment of the present invention.

In Chapter 3, the compiler 21 according to the embodiment of the present invention will be described with reference to the drawings. FIG. 2 is a functional block diagram of the compiler 21 according to the present embodiment. The compiler converts the source program 20 written in a programming language into the object code 22 using an instruction that can be processed by the processor as a target. Here, the program language is not limited to types such as C, C++, C#, and Java.

The source program 20 input to the compiler first executes lexical analysis, syntactic analysis, and semantic analysis by an intermediate code generation processing function to generate an intermediate code. At this time, the phi(φ) function is introduced. Here, the phi function is used in the intermediate code in the compilation process, and the referenced operand changes according to a basic block passed immediately before. The renamingless out-of-order execution processor described above, which does not rewrite a register, has a feature in common with a static single assignment (SSA) form, and capable of using the phi function. It is added when there are multiple possibilities of a virtual register to be referenced by differences in execution paths, or when a distance needs to be adjusted even for the same register. In the present embodiment, after executing the intermediate code generation processing, any one or more of processing (A) to (E) described below is executed to generate the object code 22 by an object code generation processing function.

Unlike compiler for usual processor, the compiler generates the object code 22 for the above-described renamingless out-of-order execution processor requires distance-conscious processing to a source operand register. Specifically, when multiple execution paths exist in a program, since the number of instructions executed in each execution path and an order thereof are generally different, it is necessary to devise a way to uniquely determine the distance to the source operand. For this purpose, an inter-register transfer instruction for copying a value of a surviving register is defined as a RMOV instruction and utilized. Further, the inter-register transfer instruction (RMOV) for adjusting the distance is instruction worth utilizing in the renamingless out-of-order execution processor as an object of the present embodiment, and is an unnecessary instruction in register naming processing used in general out-of-order.

In order to maximize the processing power of the renamingless out-of-order execution processor and reduce the size of the object code 22, it is desirable to limit the number of the inter-register transfer instruction (RMOV). Therefore, the compiler 21 of the present invention allows a computer function as the compilation apparatus 1 that generates an object code corresponding to a processor from a source program, the compilation apparatus 1 comprising at least one of:

(A) a replication necessity analysis processing unit configured to specify a location having an instruction referred by a plurality of phi functions present in one basic block, and to insert an inter-register transfer instruction into the location of the instruction;

(B) an in-loop constant analysis processing unit configured to specify a closed circuit in which a reference of a phi function is circulating, and to insert an inter-register transfer instruction into the closed circuit;

(C) an inter-instruction dependency analysis processing unit configured to specify a location having data dependency among each instruction as a reference destination of a plurality of phi functions, and to insert an inter-register transfer instruction into the location;

(D) a same instruction reference analysis processing unit configured to specify a location having a phi function referring to a result of same instruction before branching in a plurality of execution paths, and to insert an inter-register transfer instruction into the execution path; or (E) a spill out validity analysis processing unit configured to store a value of a variable with respect to an inter-register transfer instruction existing in a loop processing in a storage element other than a general-purpose register before starting the loop processing, to load the value after an end of the loop processing, and to delete the inter-register transfer instruction.

In order to comprise the components (A) to (E) in the compilation apparatus 1, the compiler 21 has functions (A) a replication necessity analysis processing function, (B) an in-loop constant analysis processing function, (C) an inter-instruction dependency analysis processing function, (D) a same instruction reference analysis processing function, and (E) a spill out validity analysis processing function corresponding to each of the components. The functions (A) to (E) will be described in detail below. It should be noted that an optimization processing function performed by general compilers, such as dead code deletion and inline expansion, can be implemented arbitrarily, thus the description thereof is omitted here.

3.1 (A) Replication Necessity Analysis Processing Function

The (A) replication necessity analysis processing function will be described by referring to FIGS. 4A and 4B. In a control flow on a left side of FIG. 4A, there is label (1) in an instruction I101, and jumps to a joining point "join" by an instruction I102. On the other hand, in a control flow on a right side, there is label (2) in an instruction I103 and label (3) in an instruction I104, which jump to a joining point "join" by an instruction I105. After joining, label (1) and label (2) are referred with a phi function in an instruction I106, and label (1) and label (3) are referred with a phi function in an instruction I107. In other words, the instruction I101, which defines label (1), is referenced by two phi functions (I106, I107) that exist in the same basic block. Here, the number "two" of the "two phi functions" is an example of a reference number discussed below. In such a case, since labels (2) and (3) are different instructions that exist in the same basic block, it is impossible to match distances of labels (1) and (2) and labels (1) and (3) at the same time.

Figure 4A:
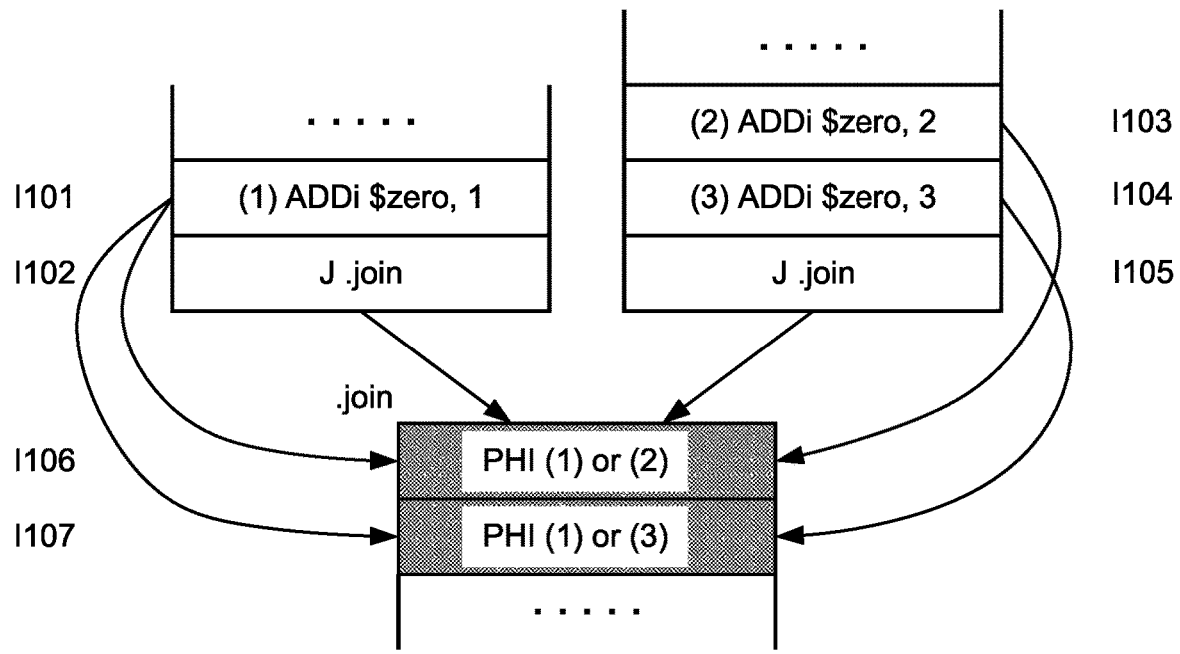
FIG. 4A shows an assembly code flow diagram when an instruction referred by a plurality of phi functions exists.
Figure 4B:
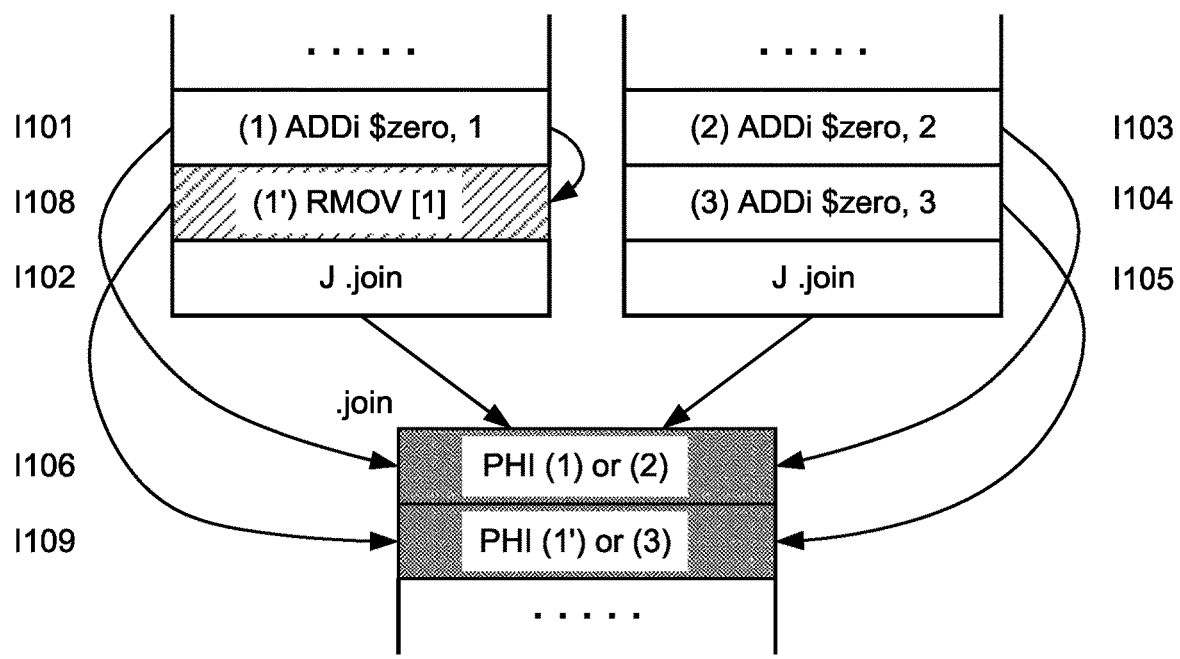
FIG. 4B shows an assembly code flow diagram solving a problem by adding an RMOV instruction to FIG. 4A.

FIG. 4B shows an assembly code flow diagram with the inter-register transfer instruction (RMOV) inserted to solve the state in FIG. 4A. One RMOV instruction is inserted immediately after the instruction I101, and label is set to (1') as well as label (1) referenced in the instruction I107 in FIG. 4A is changed to (1'), which is set to an instruction I109. In other words, this is a processing of specifying a location having an instruction referred by a plurality of phi functions present in one basic block, and inserting the inter-register transfer instruction into the location of the instruction.

To describe more specifically, a processing that specifies a location (I101) having an instruction referred to N times by a plurality of phi functions, adds (reference number (N)−1) inter-register transfer instruction (RMOV) functioning the instruction as an operand to a back of the instruction (I108), and changes operands of a plurality of referred phi functions in such a manner that the operands are different instructions to each other (I109) is executed. This method can suppress an increase of useless inter-register transfer instruction (RMOV).

3.2 (B) In-Loop Constant Analysis Processing Function

Figure 5A:
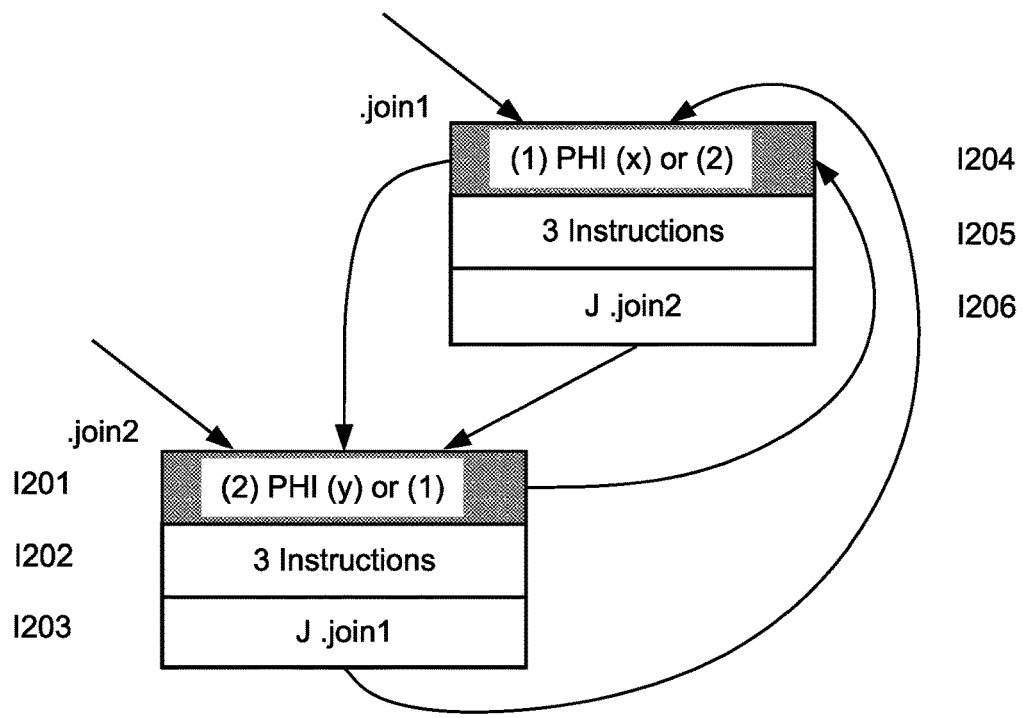
FIG. 5A shows an assembly code flow diagram when an in-loop constant exists.

The (B) in-loop constant analysis processing function will be described by referring to FIGS. 5A and 5B. In FIG. 5A, a phi function of an instruction I201 and a phi function of an instruction I204 refer to each other, resulting in a closed circuit (loop) in which references are circulated. Instruction I202 and instruction I205 are multiple instructions that are not directly related to the closed circuit configuration, and instruction I203 and instruction I206 are instructions that jump to phi functions of other sides (I204 and I201, respectively). When the closed circuit of the phi function is cycled in this way, there are no instructions exist on the closed circuit that should be referred.

Figure 5B:
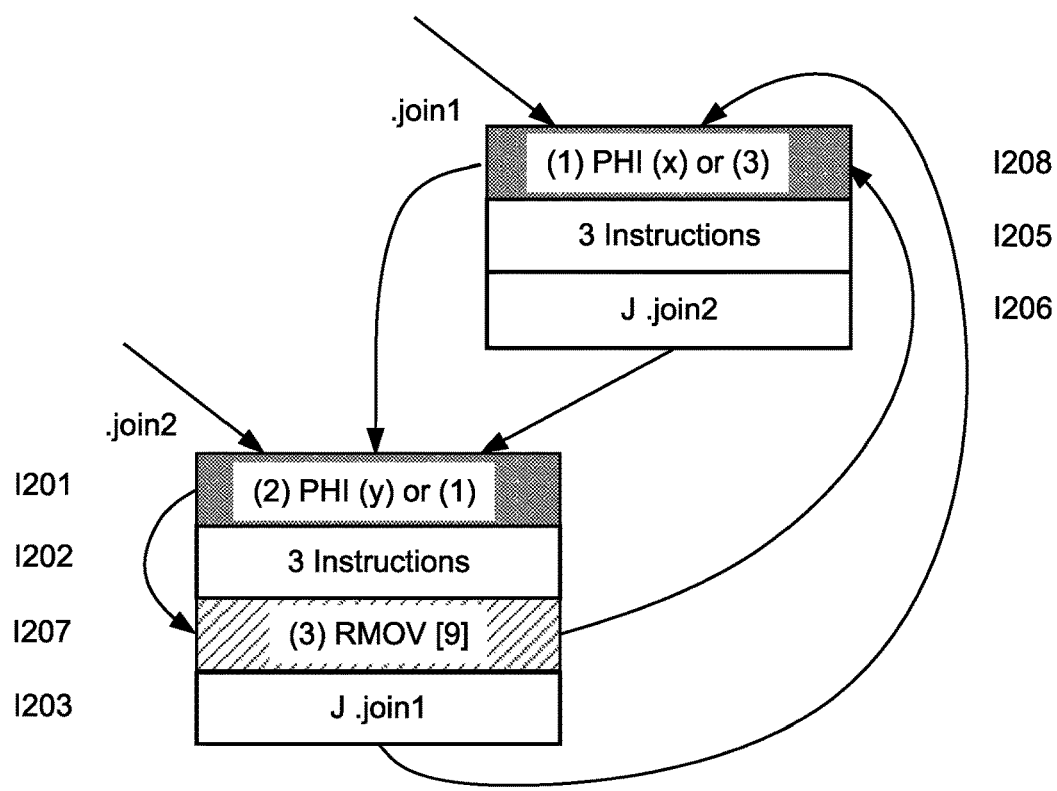
FIG. 5B shows an assembly code flow diagram solving a problem by adding an RMOV instruction to FIG. 5A.

FIG. 5B shows an assembly code flow diagram with an inter-register transfer instruction (RMOV) inserted to solve the state in FIG. 5A. A RMOV instruction I207 is inserted immediately before the jump instruction I203, and label is set to (3) as well as label (2) referenced in the instruction I204 in FIG. 5A is changed to (3), which is set to an instruction I208. In other words, this is a processing of specifying a closed circuit in which a reference of a phi function circulates, and inserting the inter-register transfer instruction into the closed circuit.

To describe more specifically, a processing of removing the directed closed circuit is executed by specifying a closed circuit in which a reference of a phi function circulates, generating a directed graph (I201→I204, I204→I201) with a phi function as a vertex and a reference from phi function to phi function as a directed edge, and adding, when a directed closed circuit (I201→I204→I201) exists in the directed graph, an inter-register transfer instruction (I207) between a phi function (I201) as a start point of an edge and a phi function (I204) as an end point of an edge.

A special case of the closed circuit (loop) by referring to the phi function is a case of a self-closing circuit in which the phi function generates a cycle that references itself (not shown). Even in the of self-closing circuit, the processing of inserting the inter-register transfer instruction RMOV is still effective.

In a programming language, loop processing, such as for statement in C language, is frequently used. Therefore, minimizing the number of instruction codes in the loop processing without adding redundant inter-register transfer instruction in the loop is effective in terms of improving the execution performance of the program.

3.3 (C) Inter-Instruction Dependency Analysis Processing Function

The (C) inter-instruction dependency analysis processing function will be described by referring to FIGS. 6A and 6B. In a basic block in the upper left of FIG. 6A, values loaded in an instruction I301 are used in an instruction I302 and an instruction I303, and in a basic block in the upper right, values loaded in an instruction I305 and an instruction I306 respectively are used in an instruction I307. On the other hand, the values join in an instruction I309 after jumping in an instruction I304 and an instruction I308, phi functions in an instruction I309, an instruction I310 and an instruction I311 are refer to "label (3) and label (4)", "label (2) and label (5)", and "label (1) and label (6)", respectively, and cannot satisfy the constraint. In this way, when there is a dependency between each instruction that is a reference to a plurality of phi functions, there is a problem that they cannot be placed in the same order in all paths.

Figure 6A:
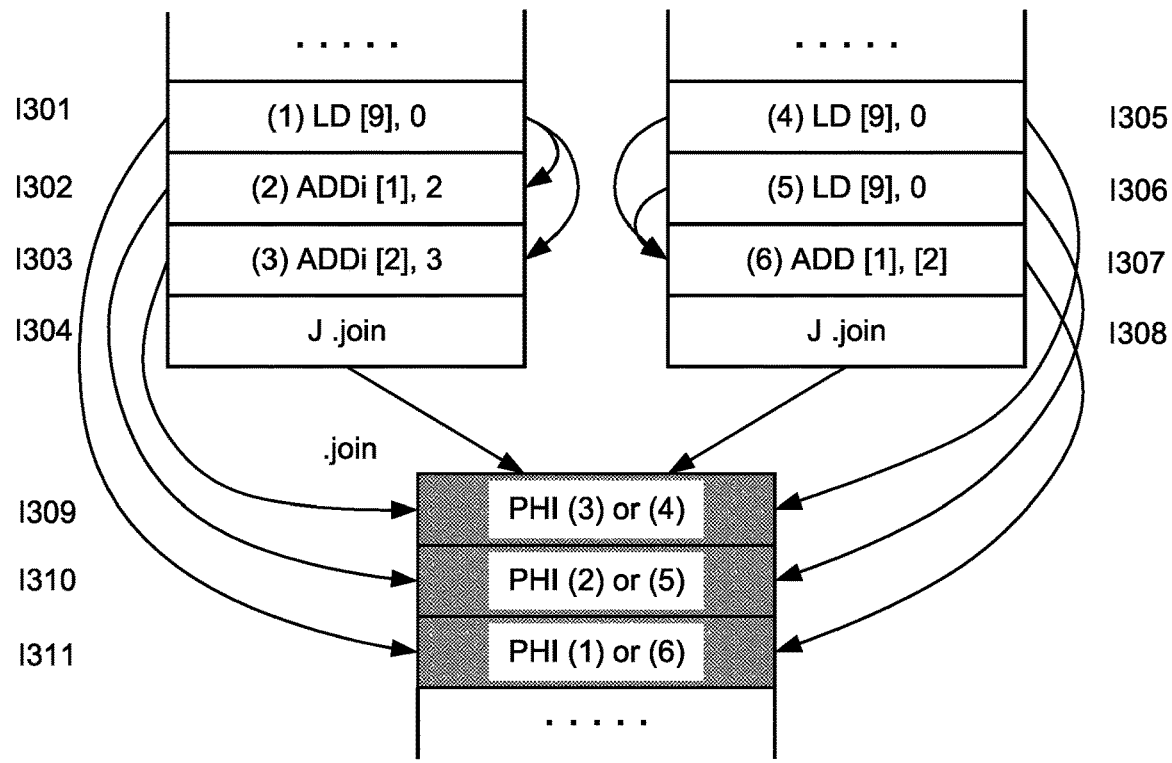
FIG. 6A shows an assembly code flow diagram when there is a data dependency between instructions.
Figure 6B:
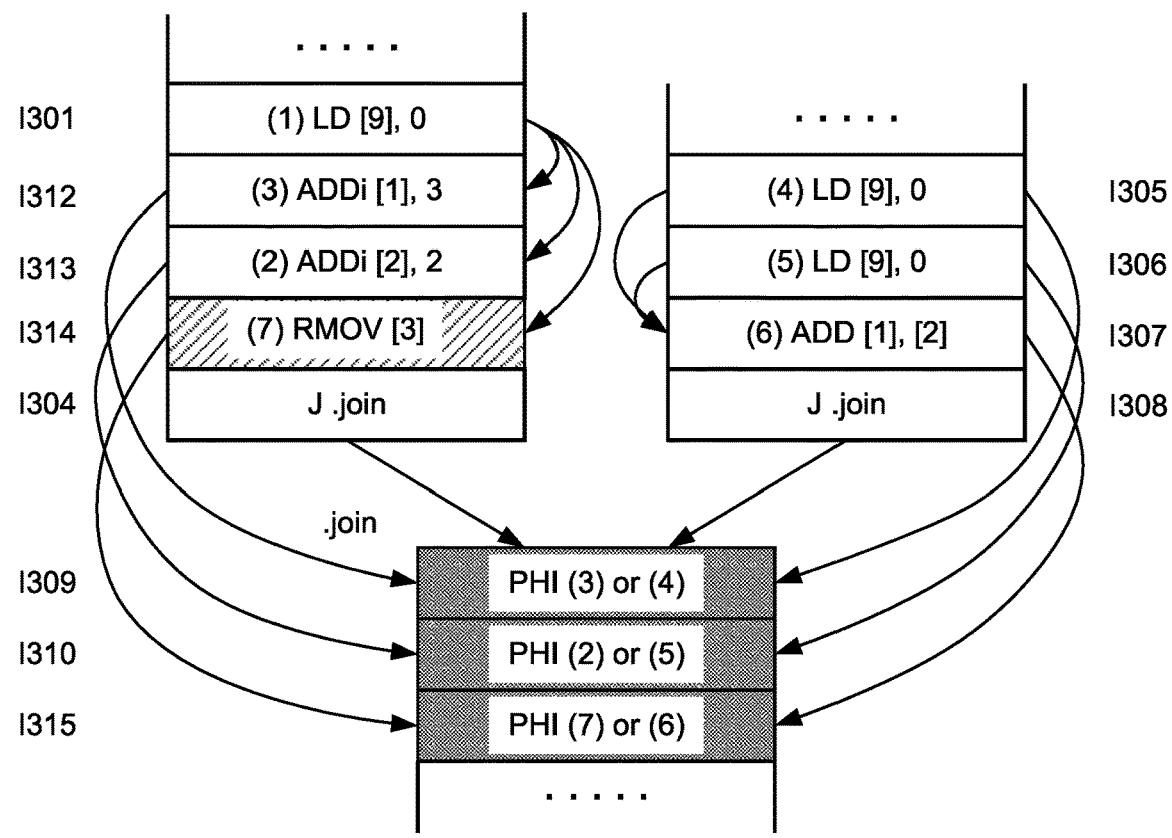
FIG. 6B shows an assembly code flow diagram solving a problem by adding an RMOV instruction to FIG. 6A.

FIG. 6B shows an assembly code flow diagram with the inter-register transfer instruction (RMOV) inserted to solve the state in FIG. 6A. A RMOV instruction I314 is inserted immediately before the jump instruction I304, and the instruction I302 and the instruction I303 are exchanged to be an instruction I312 and an instruction I313. Further, the reference to phi function in the instruction I311 is changed from label (1) to label (7) to be an instruction I315. In other words, this is a processing of specifying a location having data dependency among each instruction as a reference destination of a plurality of phi functions, and inserting the inter-register transfer instruction into the location.

To describe more specifically, the processing specifies a location having data dependency between each instruction (I301, I302, I303) as reference destinations of a plurality of phi functions (I309, I310, I311), generates a directed graph with a phi function as a vertex and a data dependence between instructions referred by a phi function, and determines whether there is a directed closed circuit in the directed graph. When the directed closed circuit does not exist, an NOP instruction can be added in such a manner that each path of topological sorting is equidistant. On the other hand, when the directed closed circuit exists, an inter-register transfer instruction (I314) is added to remove the directed closed circuit, that is, a directed acyclic graph (DAG), to enable topological sorting. When topological sorting becomes possible, all paths can be placed in the same order, and the processing of arranging them in such a manner that they are at the same distance by inserting a NOP instruction in between is executed.

3.4 (D) Same Instruction Reference Analysis Processing Function

Figure 7A:
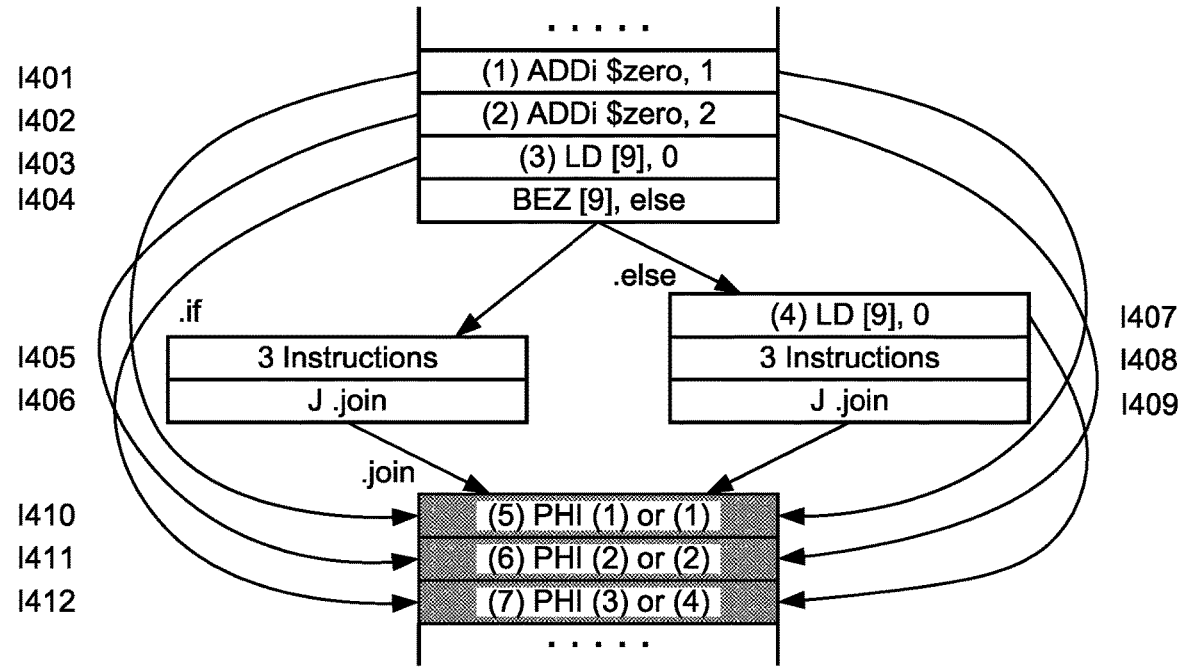
FIG. 7A shows an assembly code flow diagram when a same instruction is referenced in a plurality of execution paths.

The (D) same instruction reference analysis processing function will be described by referring to FIGS. 7A and 7B. In FIG. 7A, after the processing of instructions I401 to I404, there is a branch, which is then joined in phi function I410. At this time, phi functions I410 and I411 refer to results of the same instruction, "label (1) and label (1)" and "label (2) and label (2)", respectively. In this case, the distance adjustment may conflict with the distance adjustment of other phi functions. The reason is that normal phi function refers to two independent instructions, whereas in this case it refers to the same instruction, which reduces the degree of freedom of instruction movement, and two different instructions cannot be placed in the same position.

In order to solve the problem of FIG. 7A, it is only necessary to specify a location having a phi function referring to a result of same instruction before branching in a plurality of execution paths, and to insert an inter-register transfer instruction (RMOV) into the execution path. An example in which the problem is solved in this manner is shown in FIG. 7B and FIG. 8.

A phi function I412 in FIG. 7A refers to label (3), which is before the branch, and label (4), which is in the right side block after the branch. In order to corresponding to this, a RMOV instruction (I413) is added to the left side block after the branch and to be label (8). Then, instead of phi function I412, phi function I414 referring to label (8) and label (4) is defined.

Figure 7B:
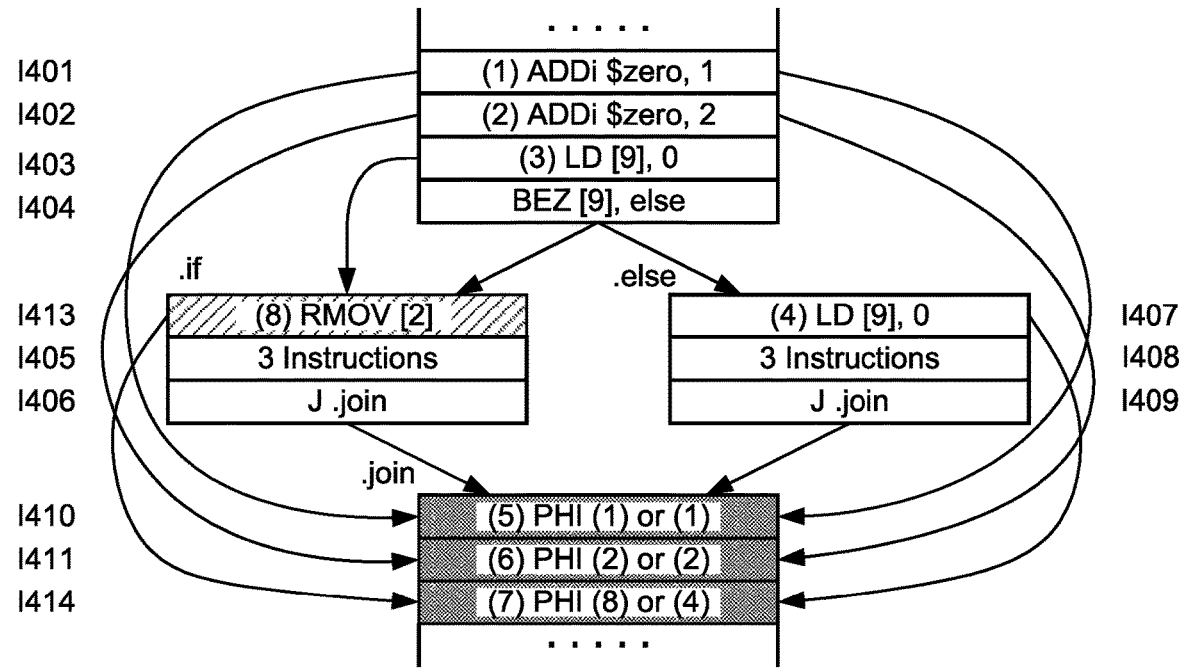
FIG. 7B shows an assembly code flow diagram solving a problem by adding an RMOV instruction to FIG. 7A.
Figure 8:
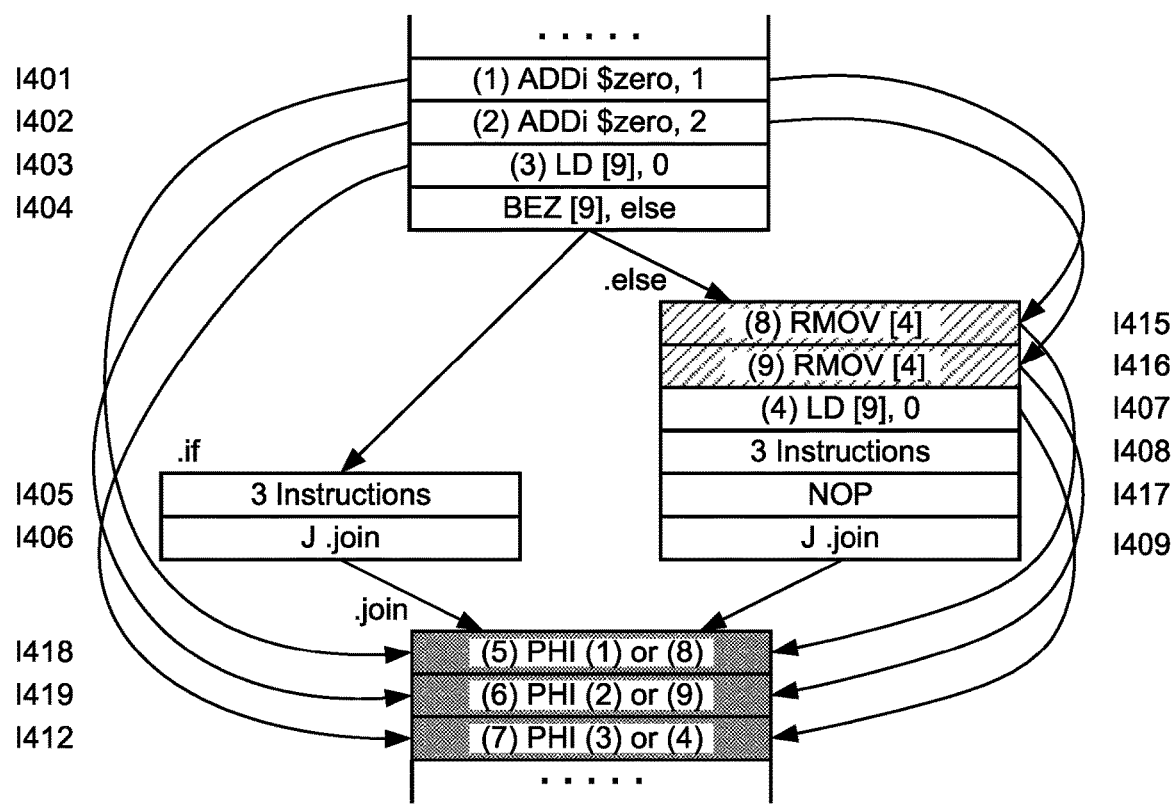
FIG. 8 shows an assembly code flow diagram that solves the problem in FIG. 7A by adding an RMOV instruction in a location different from FIG. 7B.

FIG. 8 shows a different solution from FIG. 7B. RMOV instructions I415 and I416 are added to the right side block after the branch, and being labels (8) and (9), respectively, and NOP instruction I417 is added for length adjustment. In line with label change, the references to the post-join phi functions I410 and I411 are changed to I418 and I419. Although both FIG. 7B and FIG. 8 are assembly codes that allow the renamingless out-of-order execution processor to operate normally, it is preferably that inter-register transfer instructions (RMOV) to be added are fewer, and from this perspective, it can be said that the correspondence of FIG. 7B is better.

Including the procedure of the solution method shown in FIG. 7B, a solution procedure where there is a phi function that refers to the result of the same instruction before branching in a plurality of execution paths is summarized below.

Specify a location (I410) having a phi function referring to a result of same instruction before branching in a plurality of execution paths, and classify phi functions into phi function α, phi function β, and phi function γ.

The phi function α is a phi function referring to a result of same instruction in two execution paths, which are I410 and I411 in FIG. 7A.

The phi function β is a phi function referring to results of different instructions in two execution paths, only one of which refers to the instruction before the branch, which is I412 in FIG. 7A.

The phi function γ is a phi function referring to results of different instructions in two execution paths, both of which refer to instructions before the branch.

When both phi function α and phi function β exist at the same time, add one more inter-register transfer instruction (RMOV). FIG. 7B (I413) corresponds to this.

When both phi function α and phi function γ exist at the same time, two inter-register transfer instructions (RMOV) are added. The specific example is omitted here.

3.5 (E) Spill Out Validity Analysis Processing Function

In a renamingless out-of-order execution processor, there are many cases where inter-register transfer instruction (RMOV) is placed for the purpose of holding constant values in loop processing. The procedure is necessary in the renamingless out-of-order execution processor and is unnecessary in a register renaming type processor.

When a large number of inter-register transfer instructions (RMOV), whose only purpose is to hold constants, exist in the loop processing, the object code size will increase, and the processing capability of the processor will be reduced. Therefore, it is effective to store a value of a variable targeted by the inter-register transfer instruction (RMOV) in the loop processing in a storage device other than a general-purpose register before the loop processing starts, load the value after the loop processing ends, and delete the inter-register transfer instruction (RMOV). The processing is referred to here as the spill out validity analysis processing function First, a source program written in programming language C, shown in FIG. 9A, will be described as an example. The source program shown in FIG. 9A has a for loop. An assembly code that can be executed by the renamingless out-of-order execution processor corresponding to FIG. 9A is shown in FIG. 9B. As shown in FIG. 9B, although there are inter-register transfer instructions (RMOV) exist in three lines, line 08, line 09, and line 10, these are placed in the loop to hold constants, and from the perspective of increasing the processing power of the renamingless out-of-order execution processor as whole, all the inter-register transfer instructions (RMOV) may not necessarily need to be exist in the loop.

FIG. 9C shows an example of spilling out an inter-register transfer instruction (RMOV) placed in line 10 of FIG. 9B. The inter-register transfer instruction (RMOV) in line 10 of FIG. 9B is responsible for holding return address and is not referred in the loop, thus can be a target of spill out. In FIG. 9C, the spill out value is stored (ST) in a stack, which is a storage element other than a general-purpose register, at line 07 before the loop starts from line 08, and the spill out value is loaded (LD) back in line 18 after the loop ends in line 16. A stack pointer (SP) is managed in line 02 and line 17. This processing reduces the number of instructions between line 04, the start of the loop, and line 13, the end of the loop, from eight lines in FIG. 9B to seven lines between line 08, the start of the loop, and line 16, the end of the loop, in FIG. 9C. Loop processing is a repetitive processing and reducing the number of instructions in the loop can contribute to improving the overall processing capability.

Figure 10:
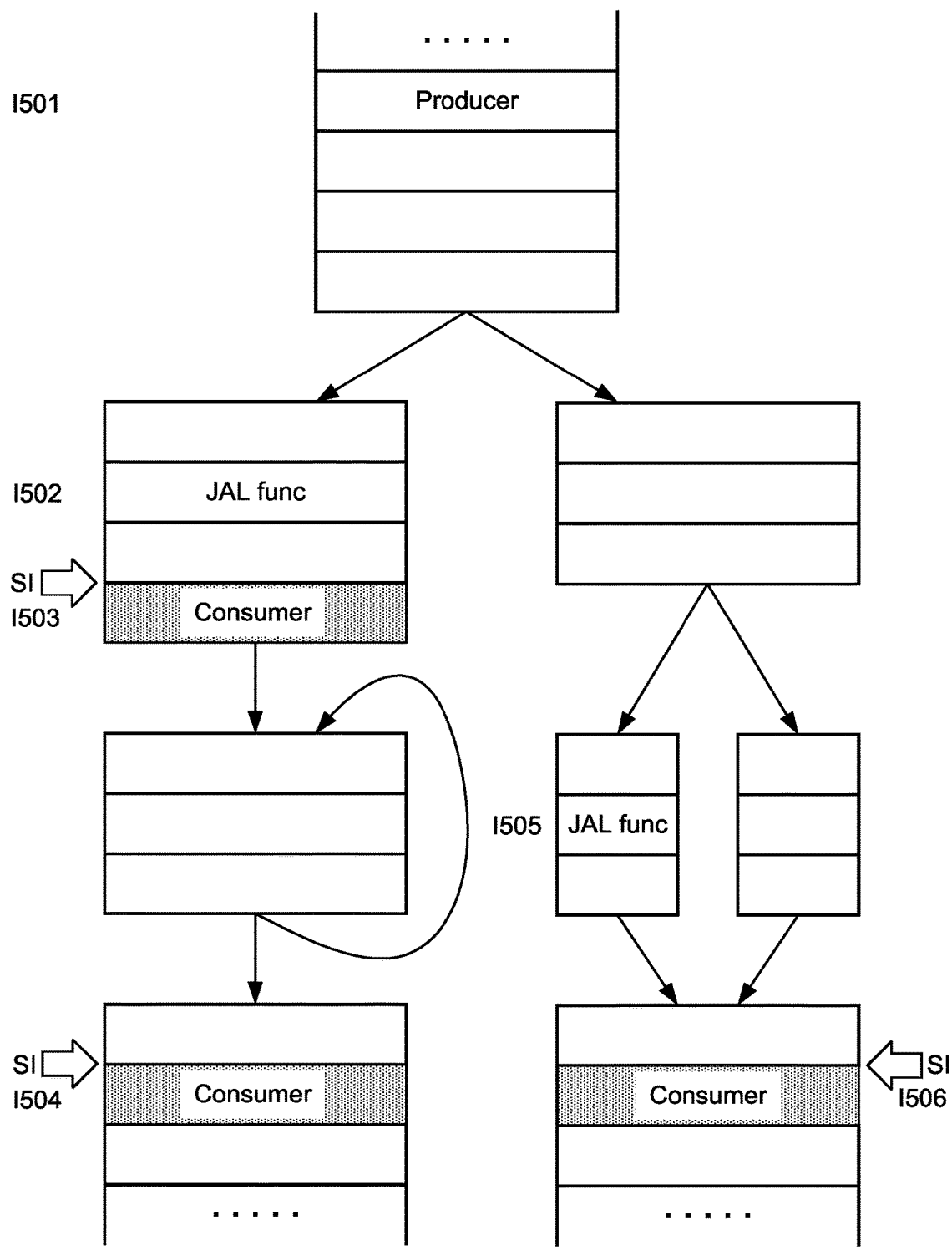
FIG. 10 shows an assembly code flow diagram indicating a location where a load instruction is inserted before a consumer instruction code referred by a variable.

FIG. 10 shows an assembly code flow diagram for a case where there is a plurality of consumer instructions in a series of assembly code. It shows a case where variables generated by a producer instruction I501 are used in consumer instructions I503, I504, and I506. In this case, a load instruction (spilling in), denoted by SI in the drawing, is inserted immediately before all consumer instructions. Note that although there is a loop processing between consumer instructions I503 and I504, there is no difference in the way to insert load instruction.

In other words, the above spill out validity analysis processing can be described as follows: regarding a value of a variable handled by an inter-register transfer instruction inserted in the loop processing, confirm a location of a producer instruction generating the value of the variable and a location of a consumer instruction referring to the value, and when all the consumer instructions do not exist in the loop processing, store the value of the variable in a storage element other than a general-purpose register after the producer instruction and before the loop processing, load the value of the variable after the loop processing and before all the consumer instructions, and delete the inter-register transfer instruction.

Note that in a conventional register renaming type processor, spill out is used only when there are insufficient function calls or general-purpose registers, however, in the renamingless out-of-order execution processor targeted by the present invention, spill out can be used even when there are enough general-purpose registers remaining and even when they are not function calls, thereby increasing the processing power of the processor.

4. COMPILATION METHOD

FIG. 11 shows a flowchart of a compilation method according to the embodiment of the present invention. In the example shown in FIG. 11, following steps are executed after the start of compilation.

S101: Intermediate code generation processing step

Perform lexical analysis, syntactic analysis, and semantic analysis on a source program to generate an intermediate code.

S102: (A) replication necessity analysis processing step

This step specifies a location having an instruction referred by a plurality of phi functions present in one basic block, and inserts an inter-register transfer instruction (RMOV) into the location of the instruction. See section 3.1 for details.

S103: (B) in-loop constant analysis processing step

This step specifies a closed circuit in which a reference of a phi function is circulating, and inserts an inter-register transfer instruction (RMOV) into the closed circuit. See section 3.2 for details.

S104: (C) inter-instruction dependency analysis processing step

This step specifies a location having data dependency among each instruction as a reference destination of a plurality of phi functions, and inserts an inter-register transfer instruction (RMOV) into the location. See section 3.3 for details.

S105: (D) same instruction reference analysis processing step

This step specifies a location having a phi function referring to a result of same instruction before branching in a plurality of execution paths, and inserts an inter-register transfer instruction (RMOV) into the execution path. See section 3.4 for details.

S106: (E) spill out validity analysis processing step

This step stores a value of a variable with respect to an inter-register transfer instruction existing in a loop processing in a storage element other than a general-purpose register before starting the loop processing, loads the value after an end of the loop processing, and deletes the inter-register transfer instruction. See section 3.5 for details.

S107: object code generation processing step

After executing the general optimization process that omits the description here, an object code corresponding to the target renamingless out-of-order execution processor is generated.

In FIG. 11, although all processing steps (A) to (E) are executed in the order as shown, it is possible to generate an object code effective for a renamingless out-of-order execution processor by executing at least one or more of the processing steps in any of (A) to (E). In addition, the processing order is not limited to the order shown in the drawing.

5. CONCLUSION

In the embodiment, as an example of an information conversion apparatus, although a compilation apparatus generating an object code corresponding to a processor from a source program has been described, an information conversion apparatus converting an object code to even more efficient object code may be implemented as well. In addition, a program for making a computer function as such an information conversion apparatus may be distributed, and such an information conversion method may be implemented.

Furthermore, the present invention may be implemented in various aspects as described below.

In the program, the information conversion apparatus comprises the (B) in-loop constant analysis processing unit.

In the program, the (A) replication necessity analysis processing unit is further configured to specify a location having an instruction referred to N times by a plurality of phi functions, to add (reference number (N)−1) inter-register transfer instruction functioning the instruction as an operand to a back of the instruction, and to change operands of a plurality of referred phi functions in such a manner that the operands are different instructions to each other.

In the program, the (B) in-loop constant analysis processing unit is further configured to specify a closed circuit in which a reference of a phi function circulates, to generate a directed graph with the phi function as a vertex and a reference from the phi function to the phi function as a directed edge, and to add, when a directed closed circuit exists in the directed graph, an inter-register transfer instruction between a phi function as a start point of an edge and a phi function as an end point of an edge.

In the program, the (C) inter-instruction dependency analysis processing unit is further configured to specify a location having data dependency between instructions as reference destinations of a plurality of phi functions, to generate a directed graph with the phi function as a vertex and a data dependence between instructions referred by a phi function, to determine whether there is a directed closed circuit in the directed graph, to add, when the directed closed circuit does not exist, an NOP instruction in such a manner that each path of topological sorting is equidistant, and to add, when the directed closed circuit exists, an inter-register transfer instruction enabling the topological sorting by removing the directed closed circuit.

In the program, the (D) same instruction reference analysis processing unit is further configured to specify a location having a phi function referring to a result of a same instruction before branching in a plurality of execution paths, to classify the phi functions into a phi function α being a phi function referring to a result of a same instruction in two execution paths, a phi function β being a phi function referring to a result of a different instruction in the two execution paths wherein only one thereof refers to an instruction before branching, and a phi function γ being a phi function referring to a result of a different instruction in the two execution paths wherein both thereof refers to an instruction before branching, and to add, when the phi function a and the phi function β exist at the same time, one inter-register transfer instruction, and to add, when the phi function α and the phi function γ exist at the same time, two inter-register transfer instruction.

In the program, the (E) spill out validity analysis processing unit is further configured to confirm, regarding a value of a variable handled by an inter-register transfer instruction inserted in the loop processing, a location of a producer instruction generating the value of the variable and a location of a consumer instruction referring to the value, and when all the (one or more) consumer instructions do not exist in the loop processing, to store the value of the variable in a storage element other than a general-purpose register after the producer instruction and before the loop processing, to load the value of the variable after the loop processing and before all the (one or more) consumer instructions, and to delete the inter-register transfer instruction.

In the program, the program is a compiler, and the information conversion apparatus is a compilation apparatus generating an object code corresponding to a processor from a source program, the processor comprising a function executing an instruction code taking an operand as a relative position that refers to a past execution result.

An information conversion apparatus comprising at least one of: (A) a replication necessity analysis processing unit configured to specify a location having an instruction referred by a plurality of phi functions present in one basic block, and to insert an inter-register transfer instruction into the location of the instruction; (B) an in-loop constant analysis processing unit configured to specify a closed circuit in which a reference of a phi function is circulating, and to insert an inter-register transfer instruction into the closed circuit; (C) an inter-instruction dependency analysis processing unit configured to specify a location having data dependency among each instruction as a reference destination of a plurality of phi functions, and to insert an inter-register transfer instruction into the location; (D) a same instruction reference analysis processing unit configured to specify a location having a phi function referring to a result of a same instruction before branching in a plurality of execution paths, and to insert an inter-register transfer instruction into the execution path; or (E) a spill out validity analysis processing unit configured to store a value of a variable with respect to an inter-register transfer instruction existing in a loop processing in a storage element other than a general-purpose register before starting the loop processing, to load the value after an end of the loop processing, and to delete the inter-register transfer instruction.

An information conversion method comprising at least one of: (A) a replication necessity analysis processing step of specifying a location having an instruction referred by a plurality of phi functions present in one basic block, and of inserting an inter-register transfer instruction into the location of the instruction; (B) an in-loop constant analysis processing step of specifying a closed circuit in which a reference of a phi function is circulating, and of inserting an inter-register transfer instruction into the closed circuit; (C) an inter-instruction dependency analysis processing step of specifying a location having data dependency among each instruction as a reference destination of a plurality of phi functions, and of inserting an inter-register transfer instruction into the location; (D) a same instruction reference analysis processing step of specifying a location having a phi function referring to a result of same instruction before branching in a plurality of execution paths, and of inserting an inter-register transfer instruction into the execution path; or € a spill out validity analysis processing step of storing a value of a variable with respect to an inter-register transfer instruction existing in a loop processing in a storage element other than a general-purpose register before starting the loop processing, of loading the value after an end of the loop processing, and of deleting the inter-register transfer instruction.

Of course, the above embodiments are not limited thereto.

Finally, various embodiments of the present invention have been described, but these are presented as examples and are not intended to limit the scope of the invention. The novel embodiment can be implemented in various other forms, and various omissions, replacements, and changes can be made without departing from the abstract of the invention. The embodiment and its modifications are included in the scope and abstract of the invention and are included in the scope of the invention described in the claims and the equivalent scope thereof.

What is claimed is:

1. A non-transitory computer readable media storing a program configured to allow a computer to function as an information conversion apparatus comprising at least one of:
   (A) a replication necessity analysis processing unit configured to:
      specify a location having an instruction referred by a plurality of phi functions present in one basic block; and
      insert an inter-register transfer instruction into the location of the instruction;
   (B) an in-loop constant analysis processing unit configured to:
      specify a closed circuit in which a reference of a phi function is circulating; and
      insert an inter-register transfer instruction into the closed circuit;
   (C) an inter-instruction dependency analysis processing unit configured to:
      specify a location having data dependency between instructions as a reference destination of a plurality of phi functions; and
      insert an inter-register transfer instruction into the location having the data dependency;
   (D) a same instruction reference analysis processing unit configured to:
   specify a location having a phi function referring to a result of a same instruction before branching in a plurality of execution paths; and
   insert an inter-register transfer instruction into an execution path of the plurality of execution paths; or
   (E) a spill out validity analysis processing unit configured to:
      store a value of a variable with respect to an inter-register transfer instruction existing in a loop processing in a storage element other than a general-purpose register before starting the loop processing;
      load the value of the variable after an end of the loop processing; and
      delete the inter-register transfer instruction,
   wherein the program is a compiler,
   the information conversion apparatus is a compilation apparatus generating an object code from a source program, and the object code is configured to be executed by a processor, and
   the processor is configured to execute an instruction code in which a relative position that refers to a past execution result is an operand.

2. The non-transitory computer readable media storing the program according to claim 1, wherein:
   the information conversion apparatus includes the (B) in-loop constant analysis processing unit.

3. The non-transitory computer readable media storing the program according to claim 1, wherein:
   the (A) replication necessity analysis processing unit is further configured to:
      specify the location having the instruction referred by the plurality of phi functions N times;
      add a first number of the inter-register transfer instruction in which the instruction is an operand, to a back of the instruction, the first number being N−1; and
      change operands of a plurality of referred phi functions in such a manner that the operands are different instructions from each other.

4. The non-transitory computer readable media storing the program according to claim 1, wherein:
   the (B) in-loop constant analysis processing unit is further configured to:
      specify the closed circuit in which the reference of the phi function circulates;
      generate a directed graph with the phi function as a vertex and a reference from the phi function to the phi function as a directed edge; and
      add, when a directed closed circuit exists in the directed graph, the inter-register transfer instruction between a phi function as a start point of an edge and a phi function as an end point of an edge.

5. The non-transitory computer readable media storing the program according to claim 1, wherein:
   the (C) inter-instruction dependency analysis processing unit is further configured to:
      specify the location having the data dependency between the instructions as the reference destination of the plurality of phi functions;
      generate a directed graph with a phi function as a vertex and a data dependence between instructions referred by a phi function as a directed edge;
      determine whether there is a directed closed circuit in the directed graph;
      add, when the directed closed circuit does not exist, a no operation (NOP) instruction in such a manner that each path of topological sorting is equidistant; and
      add, when the directed closed circuit exists, the inter-register transfer instruction enabling the topological sorting by removing the directed closed circuit.

6. The non-transitory computer readable media storing the program according to claim 1, wherein:
   the (D) same instruction reference analysis processing unit is further configured to:
      a specify the location having the phi function referring to the result of the same instruction before branching in the plurality of execution paths;

classify phi functions into:
  a phi function α being a phi function referring to a result of a same instruction in two execution paths;
  a phi function β being a phi function referring to a result of a different instruction in the two execution paths wherein only one thereof refers to an instruction before branching; and
  a phi function γ being a phi function referring to a result of a different instruction in the two execution paths wherein both thereof refers to an instruction before branching;
add, when the phi function α and the phi function β exist at the same time, one inter-register transfer instruction; and
add, when the phi function a and the phi function γ exist at the same time, two inter-register transfer instructions.

7. The non-transitory computer readable media storing the program according to claim 1, wherein:
the (E) spill out validity analysis processing unit is further configured to:
confirm, regarding the value of the variable with respect to the inter-register transfer instruction existing in the loop processing, a location of a producer instruction generating the value of the variable and a location of a consumer instruction referring to the value of the variable; and
when one or more consumer instructions do not exist in the loop processing,
  store the value of the variable in the storage element after the producer instruction and before the loop processing,
  load the value of the variable after the loop processing and before one or more consumer instructions, and
  delete the inter-register transfer instruction.

8. An information conversion apparatus comprising:
a processor configured to execute a program so as to perform a process defined in at least one of:
(A) a replication necessity analysis processing unit configured to:
  specify a location having an instruction referred by a plurality of phi functions present in one basic block; and
  insert an inter-register transfer instruction into the location of the instruction;
(B) an in-loop constant analysis processing unit configured to:
  specify a closed circuit in which a reference of a phi function is circulating; and
  insert an inter-register transfer instruction into the closed circuit;
(C) an inter-instruction dependency analysis processing unit configured to:
  specify a location having data dependency between instructions as a reference destination of a plurality of phi functions; and
  insert an inter-register transfer instruction into the location;
(D) a same instruction reference analysis processing unit configured to:
specify a location having a phi function referring to a result of a same instruction before ranching in a plurality of execution paths; and
insert an inter-register transfer instruction into an execution path of the plurality of execution paths; or
(E) a spill out validity analysis processing unit configured to:
  store a value of a variable with respect to an inter-register transfer instruction existing in a loop processing in a storage element other than a general-purpose register before starting the loop processing:
  load the value after an end of the loop processing; and
  delete the inter-register transfer instruction,
wherein the program is a compiler,
the information conversion apparatus is a compilation apparatus generating an object code from a source program, and the object code is configured to be executed by a processor, and
the processor is configured to execute an instruction code in which a relative position that refers to a past execution result is an operand.

9. An information conversion method of an information conversion apparatus for causing a processor to execute a program, the information conversion method comprising at least one of:
(A) a replication necessity analysis processing step of:
  specifying a location having an instruction referred by a plurality of phi functions present in one basic block; and
  inserting an inter-register transfer instruction into the location of the instruction;
(B) an in-loop constant analysis processing step of:
  specifying a closed circuit in which a reference of a phi function is circulating; and,
  inserting an inter-register transfer instruction into the closed circuit;
(C) an inter-instruction dependency analysis processing step of:
  specifying a location having data dependency between instructions as a reference destination of a plurality of phi functions, and
  inserting an inter-register transfer instruction into the location;
(D) a same instruction reference analysis processing step of:
specifying a location having a phi function referring to a result of a same instruction before branching in a plurality of execution paths; and
inserting an inter-register transfer instruction into an execution path of the plurality of execution paths; or
(E) a spill out validity analysis processing step of:
  storing a value of a variable with respect to an inter-register transfer instruction existing in a loop processing in a storage element other than a general-purpose register before starting the loop processing;
  loading the value after an end of the loop processing; and
  deleting the inter-register transfer instruction,
wherein the program is a compiler,
the information conversion apparatus is a compilation apparatus generating an object code from a source program, and the object code is configured to be executed by a processor, and
the processor is configured to execute an instruction code in which a relative position that refers to a past execution result is an operand.

* * * * *